United States Patent
Schierling et al.

[11] Patent Number: 6,058,801
[45] Date of Patent: May 9, 2000

[54] TORSIONAL VIBRATION DAMPER WITH A CLOSURE FOR OPENINGS FOR FILLING THE GREASE CHAMBER

[75] Inventors: Bernhard Schierling, Kürnach; Rudolf Bäuerlein, Schewinfurt; Hilmar Göbel, Grafenrheinfeld; Matthias Fischer, Eltingshausen, all of Germany

[73] Assignee: Mannesmann Sachs AG, Schweinfurt, Germany

[21] Appl. No.: 08/957,340

[22] Filed: Oct. 24, 1997

[30] Foreign Application Priority Data

Oct. 24, 1996 [DE] Germany ............... 196 44 173

[51] Int. Cl.$^7$ ............... F16D 3/66; F16F 15/22; G05G 1/00; G05G 5/00

[52] U.S. Cl. ............... 74/573 F; 74/572; 74/574; 464/24; 192/70.17

[58] Field of Search ............... 74/572, 573 R, 74/573 F, 574; 464/24, 67, 68; 192/213.1, 70.17, 30 R

[56] References Cited

U.S. PATENT DOCUMENTS

| | | | |
|---|---|---|---|
| 5,242,328 | 9/1993 | Friedmann et al. | 464/24 |
| 5,349,883 | 9/1994 | Reik et al. | 74/574 |
| 5,687,618 | 11/1997 | Kajitani et al. | 74/573 F |
| 5,794,750 | 8/1998 | Jackel | 192/70.17 |
| 5,863,252 | 1/1999 | Friedmann et al. | 464/24 |

FOREIGN PATENT DOCUMENTS

| | | |
|---|---|---|
| 36 28 774 | 4/1987 | Germany . |
| 41 28 868 | 3/1993 | Germany . |
| 195 24 100 | 7/1996 | Germany . |
| 2 251 284 | 7/1992 | United Kingdom . |
| 2 288 652 | 10/1995 | United Kingdom . |
| 2 182 415 | 5/1998 | United Kingdom . |

*Primary Examiner*—Vinh T. Luong
*Attorney, Agent, or Firm*—Cohen, Pontani, Lieberman & Pavane

[57] ABSTRACT

A torsional vibration damper has a first flywheel mass on the drive side and a second flywheel mass which is rotatable relative to the first flywheel mass and is connected therewith via a torsional damping device. At least one of the flywheel masses is provided with a grease chamber containing a viscous medium for at least partial accommodation of the torsional damping device. There is at least one opening which is provided with a closure and axially penetrates at least one wall of the flywheel mass for filling the grease chamber with the viscous medium. The closure is formed by a cover which is accommodated at the respective flywheel mass and movable in the axial direction relative to the opening. In a sealing position the cover covers the opening, and a filling position is removable from the opening by a connection piece which can be guided through the opening for filling the grease chamber.

11 Claims, 5 Drawing Sheets

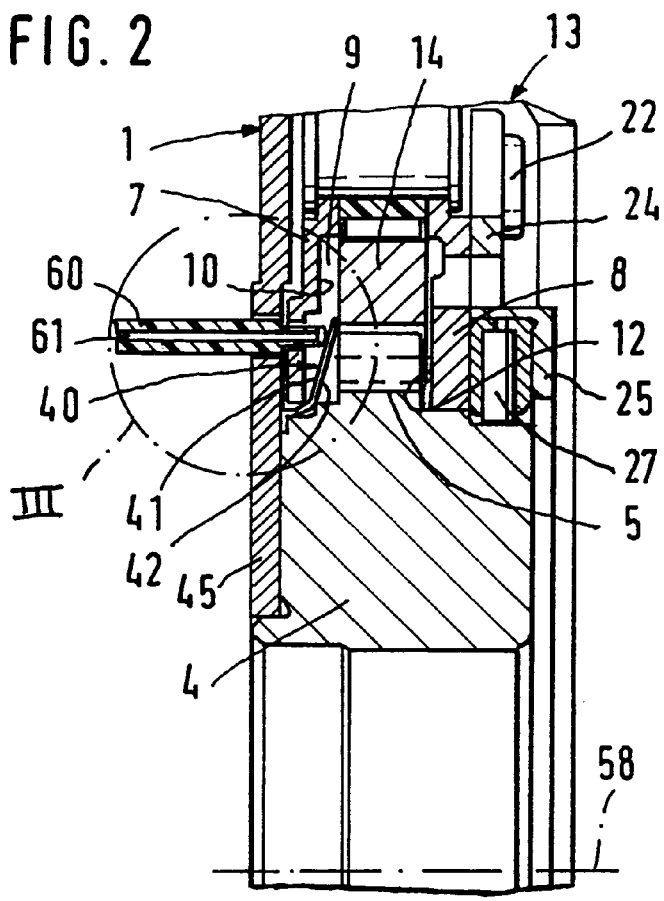
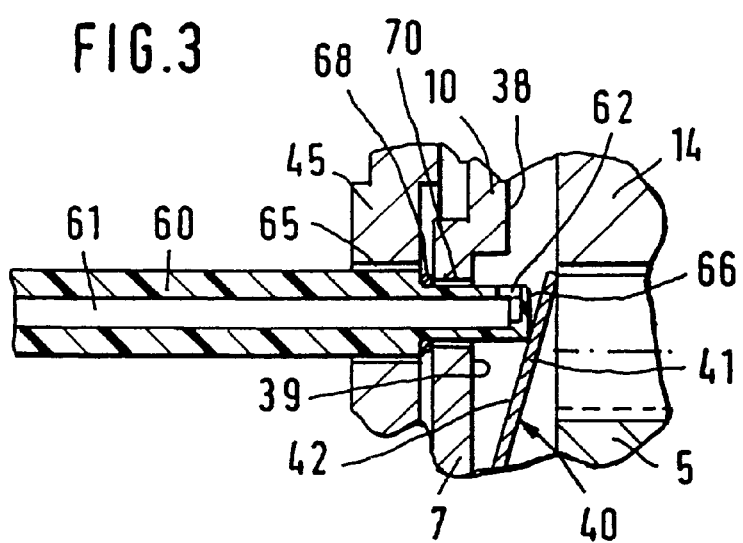

TORSIONAL VIBRATION DAMPER WITH A CLOSURE FOR OPENINGS FOR FILLING THE GREASE CHAMBER

BACKGROUND OF THE INVENTION

1. Field of the Invention

The invention is directed to a torsional vibration damper, especially for clutches in motor vehicles.

2. Description of the Prior Art

A torsional vibration damper is known from German reference DE 36 28 774 A1 which has a first flywheel mass on the drive side and a second flywheel mass which is rotatable relative to the first flywheel mass and is connected via a torsional damping device. At least one of these flywheel masses is provided with a grease chamber containing a viscous medium for at least partial accommodation of the torsional damping device. Openings provided for mounting purposes extend axially in the wall of the drive-side flywheel mass, which wall faces a drive. Each of these openings can be closed by a closure in the form of a sealing cap which can be inserted into the opening so that viscous medium contained in the grease chamber of the flywheel mass cannot exit from the flywheel mass at this location.

The disadvantage in this type of construction of the closure is that a tight seal is no longer ensured when the closure is opened and then closed again several times. Another problem, arising especially when transporting the torsional vibration damper and during subsequent assembly, is that the closure, inasmuch as it is included along with the torsional vibration damper in a loose fashion, could be lost since it is usually only inserted into the associated opening after the grease chamber is filled with viscous medium.

SUMMARY OF THE INVENTION

Accordingly, it is an object of the present invention to develop a closure for an opening for filling the grease chamber of a flywheel mass with viscous medium, which closure is provided at the flywheel mass such that it cannot be lost and does not lose its sealing effect even after many filling procedures.

Pursuant to this object, and others which will become apparent hereafter, one aspect of the present invention resides in a torsional vibration damper having a closure for the filling opening in the wall of the flywheel mass. The closure includes a cover that is axially movable relative to the opening. The cover being movable into a sealing position in which it isolates the opening relative to the grease chamber. The cover is removable from the opening by a connection piece that can be guided through the opening for filling the grease chamber. Loss of the closure is ruled out by forming the closure as a cover which is received at the respective flywheel mass, this closure being formed by a cover which is movable or deformable in the axial direction, but which can be secured in the other direction, for example, in the radial direction. The movability in the axial direction ensures that the can be moved out of a sealed, and thus a normal, position for filling the grease chamber in that a connection piece provided for filling is inserted through the opening. The opening which is otherwise closed is accordingly released by the cover, so that viscous medium arriving via the connection piece can flow into the grease chamber. As soon as this process has been concluded, the connection piece is removed again from the flywheel mass so that the cover can return to its sealing position and the opening is accordingly automatically closed. Consequently, the filling process can be effected automatically since the closure automatically adapts to given requirements.

In another embodiment of the invention, the cover is allowed to project into the grease chamber since, in this case, the connection piece, by pushing into the opening, is capable of pressing the cover into the grease chamber and thus clearing the path for the introduction of viscous medium. The sealing of the opening against an emergence of viscous fluid also turns out to be advantageous as soon as the connection piece is removed from the opening again. It is particularly advantageous when, in accordance with a further embodiment, the point at which the cover presses against the wall lies radially outside of the opening because, in the event that viscous medium penetrates between the cover and the associated region of the wall or if residual medium still remains at the conclusion of the filling process, this medium can pass into the grease chamber along the contact pressure point by means of a subsequent rotating process at the torsional vibration damper under the influence of centrifugal force.

According to further embodiment, the cover is configured to project into the grease chamber so that in the sealing position the cover is offset axially with its side facing the opening relative to the wall surrounding the opening. The axial offset is limited to a gap width of the sealing chamber at the sealing location. This provides a sealing action which is noncontacting relative to the associated wall containing the opening and accordingly works without wear. However, the claimed gap width must be kept so narrow that the viscous medium can be prevented from exiting. Also, a cover constructed in this way, like the cover described previously which contacts the associated wall along a contact pressure point, can be elastically deformable in the axial direction by the action of the connection piece. Owing to its elasticity, the cover automatically returns to the sealing position when the axial force is relieved when the connection piece moves back or is removed from the opening. Therefore, spring steel is preferably used for the cover. The spring cover can be formed either as a disk spring or a diaphragm-like element, for example. The disk spring exerts a relatively high contact pressure force, while the diaphragm-like element which is constructed in an extremely thin manner in the axial direction compared with its radial dimensions normally has a comparatively small pretensioning. The force acting on the contact pressure point of the cover is accordingly relatively small.

In still another embodiment of the invention the connection piece is provided with a duct through which viscous medium can flow. The duct extends substantially parallel to the rotational axis of the flywheel masses after insertion of the connection piece into the opening, wherein the supplied viscous medium is introduced into the grease chamber via the duct, namely in the region of the closure where the medium flows into the grease chamber via an outlet which runs radially outward, while the free end of the connection piece, with its axial side, holds the cover at a distance from the opening for the filling process.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows a view of the closure in its filling position;

FIG. 3 is a view corresponding to FIG. 2, but with enlarged detail of the closure;

DETAILED DESCRIPTION OF THE PREFERRED EMBODIMENTS

Figure 1:
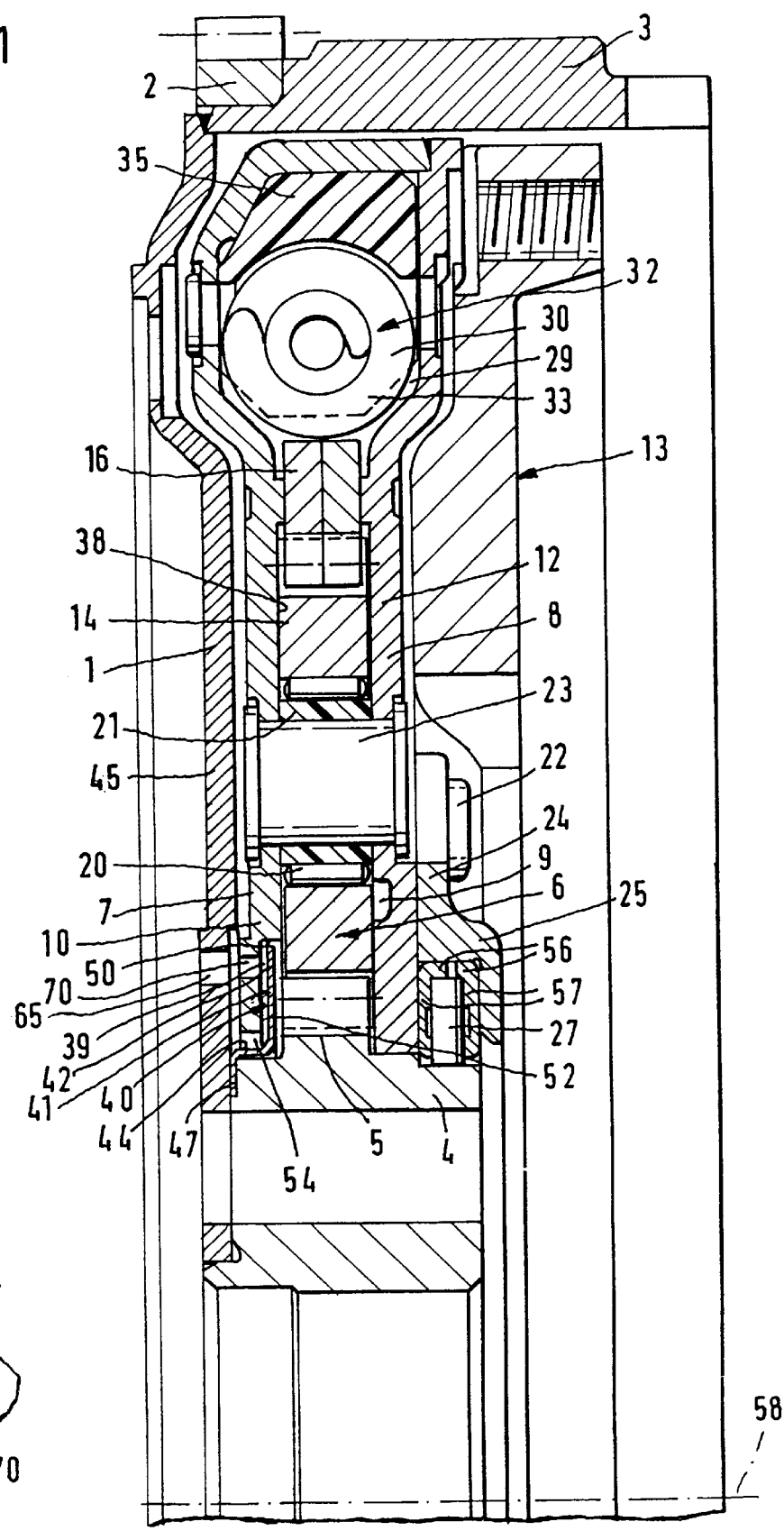
FIG. 1 shows a torsional vibration damper pursuant to the present invention with two flywheel masses which are rotatable relative to one another, one of which is constructed with a grease chamber, the openings for filling with viscous medium and a closure for these openings.

FIG. 1 shows a torsional vibration damper which has, at its left-hand side, a drive-side flywheel mass 1 with a primary flange 45 running substantially radially outward. This primary flange 45 is provided, in the circumferential region on an axial ring 3, with a toothed rim 2 for a starter pinion, not shown. The primary flange 45 is attached to a hub 4 which can be arranged at a crankshaft, not shown, of an internal combustion engine and which carries a sun gear 5 of a planetary gear set 6 so as to be fixed with respect to rotation relative thereto. The planetary gear set 6 has two planet carriers 7, 8 which are arranged on both sides of the sun gear 5 and which act as walls 10, 12 of a flywheel mass 13 on the driven side, which walls 10, 12 define a grease chamber 9 in the axial direction. Also accommodated within the grease chamber 9 are planet gears 14 which engage via their toothing with the sun gear 5 and an internal ring gear 16 which is connected in turn with the planet gears 14 via its toothing. The planet carriers 7, 8 mentioned above are provided with a plurality of bearings 20, for example, needle bearings, which are arranged on the same diameters and on which one of the planet gears 14 is arranged. The planet carriers 7, 8 are held at a fixed distance from one another in the axial direction by sleeves 21 and are drawn firmly against the two ends of the respective sleeve 21 by rivets 23 which are arranged in the sleeves 21. Additional rivets 22 connect a cover 24 with the planet carrier 8 remote of the drive-side flywheel mass 1 such that the cover 24 is fixed with respect to rotation relative to the planet carrier 8. A shoulder 25 formed at the cover 24 comes into contact with a bearing 27, for example, a roller bearing, at the side remote of the planet carrier 8. The driven-side flywheel mass 13 is supported via the bearing 27 so as to be rotatable relative to the drive-side flywheel mass 1. It is noted in addition that the internal ring gear 16 mentioned above has, radially outside of the area of engagement between its teeth and the planet gears 14, recesses 29 which are formed at predetermined angular distances from one another. Into each of these recesses 29 is inserted a spring arrangement 30 of a damping device 32 having a plurality of springs 33 which are interconnected by sliding blocks 35 in a manner known from German reference DE 41 28 868 A1. The spring arrangement 30 is supported at one end at the internal ring gear 16 and at the other end at the planet carriers 7, 8, namely via control means, not shown. The spring arrangement 30 is situated between the two planet carriers 7, 8 in the axial direction. The planet carriers 7, 8 are connected with one another in a stationary manner in the radial outer region and secure the toothed wheels 14, 16 in the axial direction.

As was already mentioned, the planet carriers 7, 8 serve as walls 10, 12 defining the grease chamber 9 which can be filled with viscous medium. Viscous medium is prevented from exiting the grease chamber 9 as follows. On the left-hand side in FIG. 1, the wall 10 of the driven-side flywheel mass 13 has in the radial inner region an annular depression 39 which, as viewed from the grease chamber 9, is offset toward the rear relative to the side 38 of the wall 10 facing the toothed wheels 14, 16, which wall 10 extends farther outward radially. The depression 39 serves to receive a closure 40 which includes a cover 41 with a flange part 42 extending substantially radially outward, a bearing part 44 annularly enclosing the hub 4, and a clamping part 47 which is directed radially inward and engages between the primary flange 45 and the hub 4. The cover 41 is formed by a thin plate part which is spaced by a gap width from the radial circumferential edge 50 of the depression 39 as well as from the wall 52 defining the depression 39 which faces the flange part 42. On the other hand, the side of the cover 41 facing the toothed wheels 5, 14 is at a considerably greater distance from the toothed wheels 5, 14 compared to the gaps mentioned above.

The wall 10 of the driven-side flywheel mass 13 ends in the radial inner region at a distance from the hub 4, so that the remaining annular opening 54 allows the bearing part 44 of the cover 41 to pass through. The cover 41 is held between the primary plate 45 of the drive-side flywheel mass 1 and the hub 4, preferably so as to be fixed with respect to rotation via the clamping part 47.

In contrast to wall 10, wall 12 at the other side of the toothed wheels 5, 14 and 16 advances radially up to the hub 4 and encloses, within its radial inner region and the shoulder 25 of the cover 24, a two-part bearing shield 56 whose chief function is to prevent viscous medium which might enter through a gap between the radial inner side of the wall 12 and the hub 4 from passing through the bearing 27 and thus from exiting the torsional vibration damper. The bearing shield 56 which is held radially between the cover 24 and an outer bearing ring, not shown, of the bearing 27 is provided with annular arms 57 on both sides of the bearing 27 which extend up to the sides of a radial inner bearing ring, also not shown, of the bearing 27 and are pressed against the inner bearing ring with predeterminable pretensioning. In this way, the above-mentioned sealing function of the bearing 27 is effected via the arms 57.

In the following, the operation of the closure will be explained. When a torque upon which are superposed torsional vibrations is introduced to the flywheel mass 1 in an internal combustion engine used as driving means so that the flywheel mass 1 rotates about the axis 58, the toothed wheels 5, 14 and 16 are set in rotation.

As a result of this rolling movement of one toothed gear upon the other, viscous medium located between the teeth is pressed out in the axial direction. Unlike in the region radially outside of the depression 39 in the wall 10 of the planet carrier 7, whose side 38 facing the toothed wheels 14, 16 approaches these toothed wheels up to a gap width and on which the axially displaced medium impinges with relatively high kinetic energy, the depression 39 and thus the set-back arrangement of the cover 41 creates a spacing between the cover 41 and the associated toothed wheels 5, 14 which is large enough so that the kinetic energy which ensures that the axially displaced medium is sprayed away is already reduced to a great extent before the medium reaches the flange part 42 of the cover 41. The flange part 42 acts as a shield for this medium impinging on the cover 41 so that, depending on the operating phase of the torsional vibration damper, the medium is conveyed radially inward or radially outward at the flange part 42. This is shown by way of example in the upper half of the torsional vibration damper shown in FIG. 1. In the event that the driving means and thus the torsional vibration damper are halted immediately after viscous medium strikes the flange part 42, the viscous medium can run radially inward under the influence of gravitational force along the side 38 of the wall 10 until it comes to a stop in the external region of the hub 4, at the latest in the region in which the bearing part 44 merges into the clamping part 47. In the other case, where the operation of the torsional vibration damper continues as medium strikes the flange part 42, the medium flows radially outward under the influence of centrifugal force at the flange part 42, deposits at the circumferential edge 50 of the depression 38, and is conveyed radially outward due, in part, to the rotation of the planet gears 14.

Figure 1A:
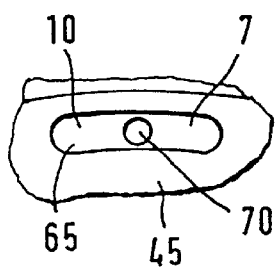
FIG. 1a shows a view of the openings from the axial direction.

As can be seen in FIG. 1, an opening 65, 70 is provided in the primary flange 45 and in the wall 10 of the adjacent planet carrier 7, wherein the opening 65 in the primary flange 45 extends in the circumferential direction similar to an elongated hole (FIG. 1a). The reason for this is that it compensates for angular offsets of the two openings 65, 70. The opening 70 is closed in the position of the cover 41 shown in FIG. 1, so that no viscous medium located in the grease chamber 9 can exit through this opening 70. The reason for the existence of the openings 65, 70 can be seen more clearly when considering FIG. 2. A connection piece 60 is guided in through the openings 65, 70 and with its free end 66 (FIG. 3) pushes the flange part 42 of the cover 41 away from the adjacent opening 70 in the planet carrier 7. This cancels the separation between the opening 70 and grease chamber 9 so that viscous medium can be guided through the primary flange 45 and the wall 10 via a duct 61 enclosing the longitudinal axis of the connection piece 60. As can be seen more clearly in FIG. 3, the connection piece 60 has at least one outlet 62 in the region of its free end 66. The outlet 62 extends substantially radially and accordingly perpendicularly to the duct 61 and communicating with the duct 61 in a flow type connection. The viscous medium flowing through the duct 61 accordingly passes through the outlet 62 into the grease chamber 9, wherein the viscous medium is prevented from exiting the grease chamber 9 via the opening 70 in the wall 10 by a seal 68 in the form of an O-ring which is provided at the connection piece 60 and brought into contact at the outer side of the wall 10 around the opening 70. For this reason, as can be seen especially clearly from FIG. 3, the opening 65 in the primary flange 45 is larger than that in the wall 10. In a corresponding manner, the connection piece 60 has an abrupt change in cross section in the region of the seal 68, wherein the free end 66 of the connection piece 60 penetrating the opening 70 in the wall 10 is smaller radially than the part penetrating the opening 65 in the primary flange 45.

The connection piece 60 is held in the grease chamber 9 only until the grease chamber 9 is filed with viscous medium. Subsequently, the connection piece 60 is removed from the flywheel mass 1, wherein the axial force deflecting the cover 41 decreases and the cover 41 can move back into its sealing position shown in FIG. 1 due to its elastic behavior. The cover 41 is advantageously constructed of spring steel in order to realize this behavior.

Figure 4:
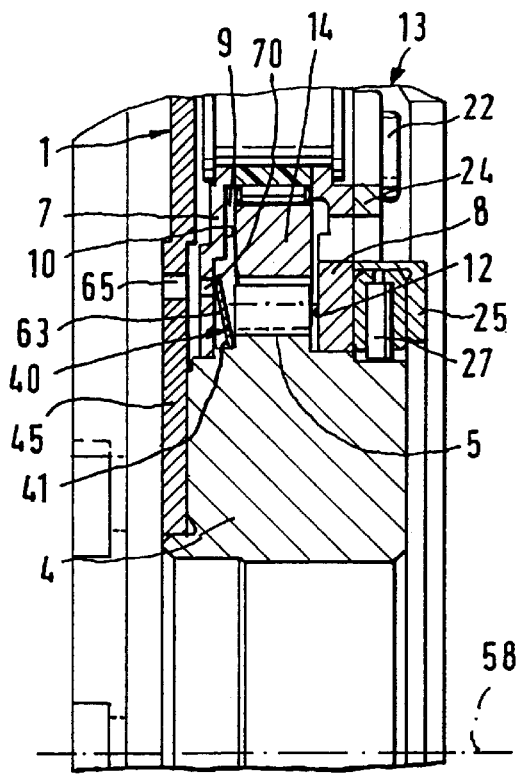
FIG. 4 is a view of another embodiment of the closure in its sealing position.
Figure 5:
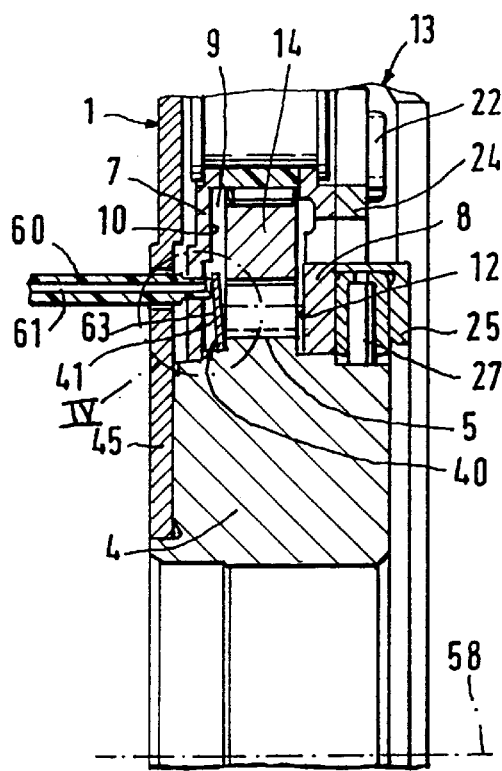
FIG. 5 is a view corresponding to FIG. 4, but with the closure in the filling position.
Figure 6:
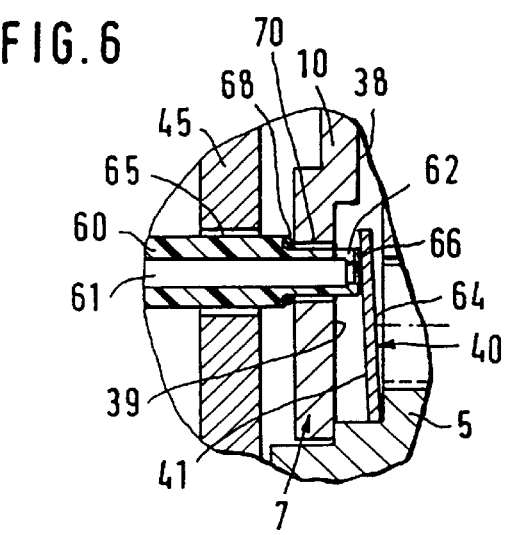
FIG. 6 is a view corresponding to FIG. 5, but with enlarged detail of the closure.

FIG. 4 shows another embodiment of the closure 40 in which a disk spring 63 is provided as the cover 41 and is supported by its radial inner end at a shoulder of the sun gear 5 and by its radial outer end at the side 38 of the wall 10, namely radially outside of the opening 70 formed in the wall 10. The disk spring 63 is pretensioned so that it contacts the wall 10 at its contact pressure point with a predeterminable contact pressing force. This results in an excellent sealing function of the disk spring 63, since viscous medium which has collected in the space axially between the disk spring 63 and the wall 10 during the filling of the grease chamber 9 is spun away radially outward under the influence of centrifugal force during subsequent operation of the torsional vibration damper and can exit the above-mentioned space along the contact pressure point of the disk spring 63 against the wall 10. In this way, the viscous medium returns to the grease chamber 9. Conversely, no viscous medium can flow back out of the grease chamber 9 into the space radially inside the contact pressure point counter to the centrifugal force. Instead of the disk spring 63, a diaphragm-like element 64 can also be provided in the same installation position as is shown by way of example in FIG. 6. An element of this type is characterized in that it is larger by a multiple in the radial direction than in the axial direction. This element is correspondingly soft in the axial direction, but a slight pretensioning can already be sufficient for sealing the opening 70.

The actual filling process corresponds to the thorough description with reference to FIG. 2 in that the connection piece 60 is pushed through the openings 65, 70 in the primary flange 45 and in the wall 10 and, in so doing, the disk spring 63 or the diaphragm like structural component part 64 is lifted from the wall 10 by the free end 66 of the connecting piece 60. Subsequently, viscous medium is pressed into the grease chamber 9 via the duct 61 and the outlet 62. After the filling process, the connection piece 60 is removed from the flywheel mass 1 again accompanied by a relaxing of the disk spring 63 or the diaphragm-like element 64, so that the disk spring 63 or the diaphragm-like element 64 can return to its sealing position as shown in FIG. 4.

Figure 7:
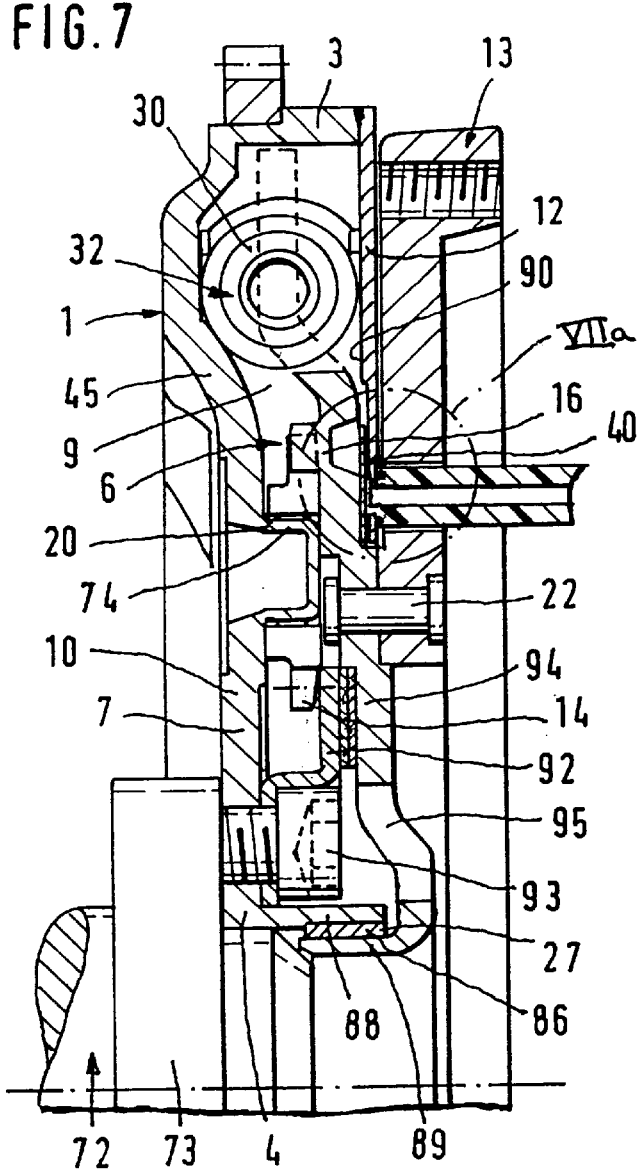
FIG. 7 is a view corresponding to FIG. 1, but with the grease chamber arranged in the other one of the two flywheel masses.

FIG. 7 shows another embodiment form of a torsional vibration damper having a different design. The flywheel mass 1 on the drive side is connected to the crankshaft 73 of a drive 72 via fastening means 93. The flywheel mass 1 has, at the radially outwardly extending primary flange 45 in the radial inner region thereof, a flange part 88 extending in the direction of the driven side. This flange part 88 encloses a sliding bearing 86 of the bearing 27 which in turn encloses a flange part 89 of a hub disk 94, which flange part 89 is directed toward the drive side. The hub disk 94 is constructed in the radial extension region of the fastening means 93 with recesses 95 associated with one of the fastening means 93. The hub disk 94 is connected in the radial center region to the flywheel mass 13 on the driven side via rivets 22 and serves, farther radially outward, as the internal ring gear 16 of the planetary gear set 6. The at least one planet gear 14 engaging with the internal ring gear 16 is arranged via the bearing 20 on an axial pressed out portion 74 of the primary flange 45, so that the flange 45 acts as a planet carrier 7. The primary flange 45, together with the axial ring 3 and the wall 12, encloses the grease chamber 9 which is sealed radially inwardly by a sealing plate 92 which is held in contact against the primary flange 45 by the fastening means 93.

Figure 7A:
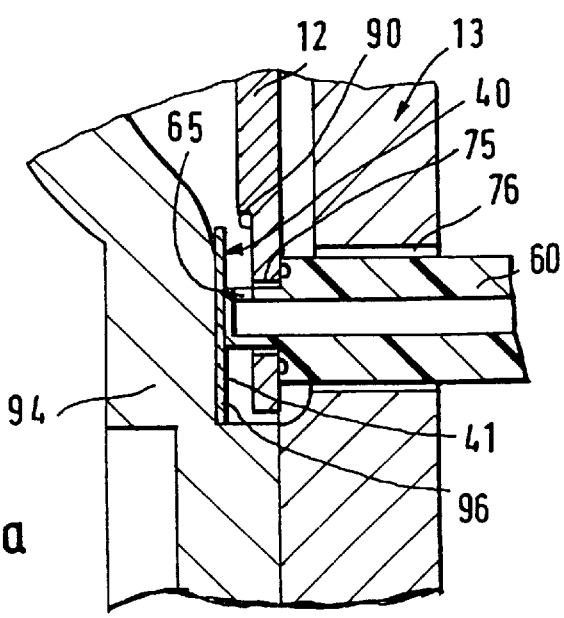
FIG. 7a is an enlarged detail of the closure in FIG. 7.

As can be seen more clearly in FIG. 7a, the wall 12 is provided with an opening 75 and the driven-side flywheel mass 13 is provided with an opening 76. The connection piece 60 can be pushed in through these openings 75 and 76 in the manner described above for filling the grease chamber with viscous medium. The cover 41 which can be formed, for example, by a disk spring 96, is lifted from the side 90 of the wall 12 by the connection piece 60 and accordingly clears the opening 75. After the filling process is concluded, the connection piece 60 is removed again from the openings 75, 76, whereupon the disk spring 96 contacts the side 90 of the wall 12 by its circumferential region in a sealing manner.

The filling process in itself corresponds to that already described above.

Figure 8:
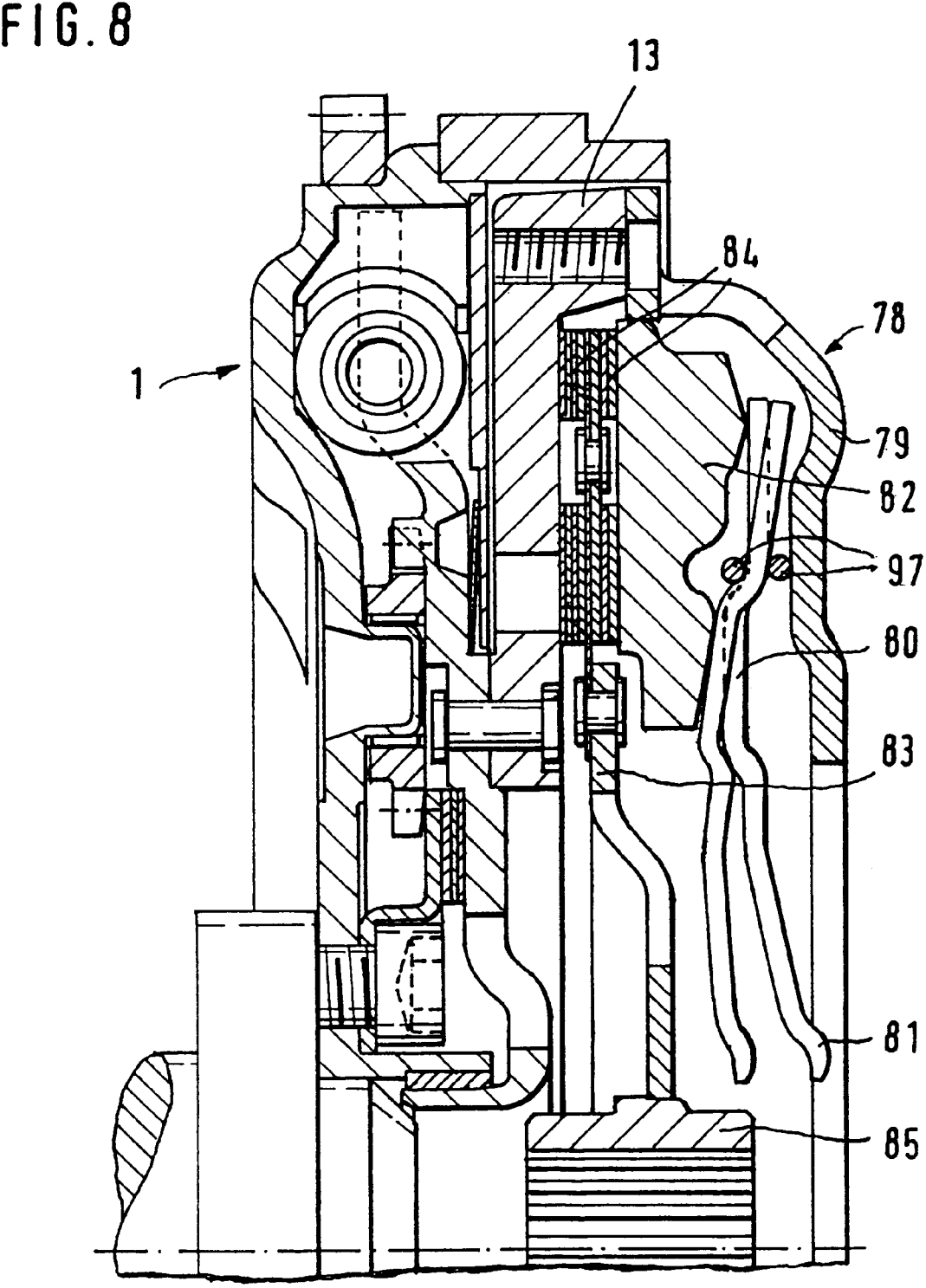
FIG. 8 is a view corresponding to FIG. 7, but with an assembled friction clutch.

The filling process for filling the grease chamber 9 described with reference to FIG. 7 is effected with the friction clutch 78 removed. The friction clutch 78 is shown in FIG. 8 for the sake of completeness and is mounted on the driven-side flywheel mass 13 at the conclusion of the filling process. The friction clutch 78 comprises a clutch housing 79 in which a diaphragm spring 80 is received via holders 97. Tongues 81 of the diaphragm spring project inward radially and can be acted upon in the axial direction in a manner not shown by a clutch release constructed in a conventional manner in order to move the tongues between the two end positions shown in FIG. 8 for engaging and releasing. In the radial outer region, the diaphragm spring 80 contacts a contact pressure plate 82, so that a clutch disk 83 provided with friction facings 84 can be acted upon by axial force in the direction of the driven-side flywheel mass 13. When the friction clutch is engaged, the movement transmitted to the clutch disk 83 via the flywheel masses 1 and 13 is transmitted to a disk hub 85 which is fastened to the radial inner end of the clutch disk 83. This disk hub 85 is constructed in the inner region with a toothing which communicates in a rotational connection with an outer toothing of the gearshaft, not shown.

The invention is not limited by the embodiments described above which are presented as examples only but can be modified in various ways within the scope of protection defined by the appended patent claims.

What is claimed is:

1. A torsional vibration damper, comprising:
    a first, drive-side flywheel mass;
    a second flywheel mass rotatable relative to the first flywheel mass about a rotational axis;
    a torsional damping device that connects the second flywheel mass to the first flywheel mass, at least one of the flywheel masses having a grease chamber configured to at least partially accommodate the torsional damping device, the at least one flywheel mass having at least one through-opening that axially penetrates a wall of the at least one flywheel mass to permit filling of the grease chamber with viscous medium;
    a closure member formed as a cover that is movable in an axial direction relative to the opening between a sealing position in which the cover seals the opening relative to the grease chamber and open position in which the cover is removed from the opening to permit filling of the grease chamber; and
    a connection piece guidable through the opening in the flywheel mass so as to move the cover from the opening for fling the grease chamber with the viscous medium.

2. A torsional vibration damper according to claim 1, wherein the cover is configured to project into the grease chamber, the cover being pretensioned so that, in the sealing position, a side of the cover facing the opening presses against a wall running radially outside and surrounding the opening.

3. A torsional vibration damper according to claim 2, wherein the cover is configured to press against the wall at a contact pressure point that lies radially outside the opening.

4. A torsional vibration damper according to claim 2, wherein the cover is elastically deformable in the axial direction when the connection piece is inserted into the opening, and springs back into the sealing position when the connection piece is removed from the opening.

5. A torsional vibration damper according to claim 1, wherein the cover is configured to project into the grease chamber and, in the sealing position, so as to be offset axially from a wall surrounding the opening, the axial offset being limited to a gap width of the sealing chamber at a sealing location.

6. A torsional vibration damper according to claim 1, wherein the connection piece has a duct through which viscous medium can flow, which duct extends substantially parallel to the rotational axis of the flywheel masses after the insertion of the connection piece into the opening, the duct having a free end with at least one outlet which runs substantially radially outward.

7. A torsional vibration damper according to claim 6, wherein the drive-side flywheel mass has an outer wall with a first opening and an inner wall with a second opening, the first opening being configured to circumferentially extend as an elongated hole, the first opening being configured to be larger in the radial direction than the second opening, the connection piece having a small diameter at its free end than in a remaining region of the connection piece, a transition between the diameters being in a region which lies axially between the two openings when the connection piece is guided into the flywheel mass opening, and further comprising a seal arranged at the cross-sectional transition so as to seal an axial outer side of the opening in the wall which adjoins the grease chamber.

8. A torsional vibration damper according to claim 1, wherein the cover is formed as a disk spring.

9. A torsional vibration damper according to claim 1, wherein the cover is a diaphragm element.

10. A torsional vibration damper according to claim 1, wherein the drive-side flywheel mass has an outer wall with a first opening and an inner wall with a second opening, the first opening being configured to circumferentially extend as an elongated hole.

11. A torsional vibration damper according to claim 10, wherein the first opening is configured to be larger in the radial direction than the second opening.

* * * * *